(12) United States Patent
Volpano

(10) Patent No.: US 7,188,364 B2
(45) Date of Patent: Mar. 6, 2007

(54) PERSONAL VIRTUAL BRIDGED LOCAL AREA NETWORKS

(75) Inventor: Dennis Michael Volpano, Salinas, CA (US)

(73) Assignee: Cranite Systems, Inc., Los Gatos, CA (US)

( * ) Notice: Subject to any disclaimer, the term of this patent is extended or adjusted under 35 U.S.C. 154(b) by 990 days.

(21) Appl. No.: 10/057,566

(22) Filed: Jan. 25, 2002

(65) Prior Publication Data

US 2003/0120763 A1    Jun. 26, 2003

Related U.S. Application Data

(60) Provisional application No. 60/343,307, filed on Dec. 20, 2001.

(51) Int. Cl.
*H04L 9/00* (2006.01)
*G06F 15/16* (2006.01)

(52) U.S. Cl. .................. 726/15; 713/150; 713/176; 370/392; 709/228

(58) Field of Classification Search ............... None
See application file for complete search history.

(56) References Cited

U.S. PATENT DOCUMENTS

| | | | | |
|---|---|---|---|---|
| 6,003,137 | A * | 12/1999 | Kawasaki ................ | 726/15 |
| 6,035,105 | A | 3/2000 | McCloghrie et al. | |
| 6,035,405 | A * | 3/2000 | Gage et al. .............. | 726/15 |
| 6,047,325 | A | 4/2000 | Jain et al. | |
| 6,085,238 | A * | 7/2000 | Yuasa et al. ............. | 709/223 |
| 6,181,699 | B1 * | 1/2001 | Crinion et al. ........... | 370/392 |
| 6,917,614 | B1 * | 7/2005 | Laubach et al. .......... | 370/392 |
| 2003/0037169 | A1 | 2/2003 | Kitchin | |
| 2004/0111520 | A1 * | 6/2004 | Krantz et al. ............. | 709/229 |

OTHER PUBLICATIONS

Security Task Group of IEEE 802.1, Draft Standard for Local and Metropolitan Area Networks: Media Access Control (MAC) Security, IEEE P802.1AE/D5.1 (Jan. 19, 2006), pp. 1-150.
IEEE Computer Society, "IEEE Standards for Local and Metropolitan Area Networks: Virtual Bridged Local Networks," IEEE std 802.1Q 2003 Edition (May 7, 2003), pp. 1-312.
Bernard Aboba, Virtual Access Points, IEEE P802.11 Wireless LANs, May 22, 2003, Mircrosoft, and pp. 1-13.

* cited by examiner

*Primary Examiner*—Christopher Revak
(74) *Attorney, Agent, or Firm*—Townsend and Townsend and Crew LLP

(57) ABSTRACT

A mechanism for segregating traffic amongst STAs that are associated with a bridge, referred to herein as the personal virtual bridged local area network (personal VLAN), is based upon the use of a VLAN to segregate traffic. The IEEE 802.1Q-1998 (virtual bridged LANs) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP. In a preferred embodiment, the Personal VLAN bridge extends the standard VLAN bridge in at least any of the following ways: VLAN discovery in which a personal VLAN bridge provides a protocol for VLAN discovery; VLAN extension in which a Personal VLAN allows a station to create a new port that serves a new VLAN, or to join an existing VLAN via an authentication protocol; Logical ports in which a Personal VLAN bridge can maintain more than one logical port per physical port, and bridges between ports of any kind; and cryptographic VLAN separation.

9 Claims, 7 Drawing Sheets

PERSONAL VIRTUAL BRIDGED LOCAL AREA NETWORKS

CROSS-REFERENCE TO RELATED APPLICATIONS

This application claims priority to U.S. patent application Ser. No. 60/343,307 filed Dec. 20, 2001.

BACKGROUND OF THE INVENTION

1. Technical Field

The invention relates to local area networks. More particularly, the invention relates to a personal virtual bridged local area network.

2. Description of the Prior Art

An access point (AP) is a link-layer bridge between one or more stations (STAs) and a distribution system (DS). See IEEE 802.11, Wireless LAN Medium Access Control and Physical Layer Specifications, ISO/IEC 8802-11:1999(E), ANSI/IEEE Std 802.11, 1999 Edition. An example of a DS is a LAN segment, or an intranet. An AP enables packets to be transmitted via radio either from a station (STA) to the DS, or from the DS to a STA. An access point therefore has at least two physical ports. One is the DS interface and the other is a radio interface. Multiple STAs, each with their own radio interface, can send packets to the DS by multiplexing the single shared radio interface of an AP. The radio interface operates at a particular frequency and the STAs share the medium through a MAC-PHY protocol that guarantees mutually exclusive access to the medium. The DS also sends packets to STAs by using the same protocol.

The STA of an AP has a Basic Service Set ID (BSSID). It serves to partition 802.11 Basic Service Sets logically. Every STA that associates with an AP shares the AP's BSSID. A frame destined for a group address received by an AP or a STA is discarded if the BSS to which the AP or STA belong does not match the BSSID of the frame. In this sense, the BSSID behaves as a Virtual LAN ID (VID). See IEEE 802.1Q, IEEE Standards for Local and Metropolitan Area Networks: Virtual Bridged Local Area Networks, IEEE Std 802.1Q-1998. Every STA is therefore a member of the same virtual LAN (VLAN) as a consequence of associating with the same AP.

Every STA in a BSS, however, should not share the same VLAN unless the STAs trust each other. Yet in public space deployments, all STAs associated with an AP are required to share the same VLAN when typically there is no trust among them. This can make a STA vulnerable, for instance, to various link-layer attacks launched by an untrusted STA, such as Address Resolution Protocol (ARP) cache re-mapping.

It would be advantageous to provide a mechanism for segregating traffic amongst STAs that are associated with a bridge such that, for example, an untrusted STA associated with said bridge can not be used to launch a link layer (OSI Layer 2) attack on another STA associated with the same bridge.

SUMMARY OF THE INVENTION

The invention provides a mechanism for segregating traffic amongst STAs that are associated with a bridge such that, for example, an untrusted STA associated with said bridge can not be used to launch a link layer (OSI Layer 2) attack on another STA associated with the same bridge. The invention is based upon the use of a VLAN to segregate traffic. The IEEE 802.1Q-1998 (Virtual Bridged LANs) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP.

Suppose an AP is attached to a DS. Every STA that associates with the AP should have an opportunity to create a new VLAN with itself and the DS as its members. This way traffic between trusted and untrusted STAs can be separated even though they associate with the same AP. In general, if the DS comprises multiple VLANs, then the members of any subset of them can be members of the new VLAN. So there should be a way to discover existing VLANs. Furthermore, there should be a protocol for joining an existing VLAN. Creating a VLAN and joining an existing VLAN are both operations that require authentication. The IEEE Std 802.1Q-1998 VLAN model is deficient for such purposes because it does not provide these capabilities. The preferred embodiment of the invention comprises a mechanism for providing such capability, referred to herein as the personal virtual bridged local area network (Personal VLAN).

In a preferred embodiment, the Personal VLAN bridge extends the standard VLAN bridge in at least any of the following ways:

VLAN discovery: A Personal VLAN provides a protocol for VLAN discovery (discussed below).

VLAN extension/creation: A Personal VLAN bridge allows a station to create a new port that serves a new VLAN, or to join an existing VLAN or to join an existing VLAN via an authentication protocol.

Logical ports: A Personal VLAN bridge can maintain more than one logical port per physical port. It bridges between ports of any kind. A VLAN's member set is defined in terms of logical and physical ports. Every logical port has a lifetime controlled by the bridge.

Cryptographic VLAN separation: In a Personal VLAN, a logical port serves at most one VLAN. However, because there may be more than one logical port per physical port, more than one VLAN may exist on a physical port. Traffic within one VLAN is separated from another VLAN on the same physical port by cryptography. An authentication code uniquely identifies the VLAN to which the traffic belongs, while another level of encryption keeps the traffic private except to members of the VLAN.

Layer-2 VLAN support across routers: When an STA can roam and reattach to a network at a different bridge, e.g. by associating with a new AP, the STA can inform the bridge of a VLAN to which it already belongs. The VLAN may have been created by a station, e.g. itself, at another bridge that links the VLAN with one or more logical or physical ports at that bridge. The STA can maintain its membership in the VLAN at layer 2 even though the new bridge may be located on a different subnet. This capability subsumes Mobile IP capability because Mobile IP aims to retain subnet membership for a station across routers. A subnet may correspond to a VLAN, but in general it does not.

Spanning tree maintenance: A Personal VLAN bridge permits an STA to create a VLAN where the STA itself is a bridge. A spanning tree algorithm eliminates cycles among bridges when membership is granted. The process for joining a personal VLAN enforces restrictions on VLAN topology that make re-constructing a spanning tree unnecessary after a new bridge joins a VLAN.

DETAILED DESCRIPTION OF THE INVENTION

The presently preferred embodiment of the invention provides a mechanism for segregating traffic amongst STAs that are associated with a bridge such that, for example, an untrusted STA associated with said bridge can not be used to launch a link layer (OSI Layer 2) attack on another STA associated with the same bridge. Those skilled in the art will appreciate that the invention disclosed herein is applicable to a wide range of systems and networks, including but not limited to wired and wireless networks.

The Personal VLAN Bridge Model

The invention is based upon the use of a VLAN to segregate traffic. The IEEE 802.1Q-1998 (Virtual Bridged LANS) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP.

Suppose an AP is attached to a DS. Every STA that associates with the AP should have an opportunity to create a new VLAN with itself and the DS as its members. This way traffic between trusted and untrusted STAs can be separated even though they associate with the same AP. In general, if the DS comprises multiple VLANs, then the members of any subset of them can be members of the new VLAN. So there should be a way to discover existing VLANs. Furthermore, there should be a protocol for joining an existing VLAN.

Creating a VLAN and joining an existing VLAN are both operations that require authentication. The IEEE Std 802.1Q-1998 VLAN model is deficient for such purposes because it does not provide these capabilities. The preferred embodiment of the invention comprises a mechanism for providing such capability, referred to herein as the personal virtual bridged local area network (Personal VLAN).

Figure 1:
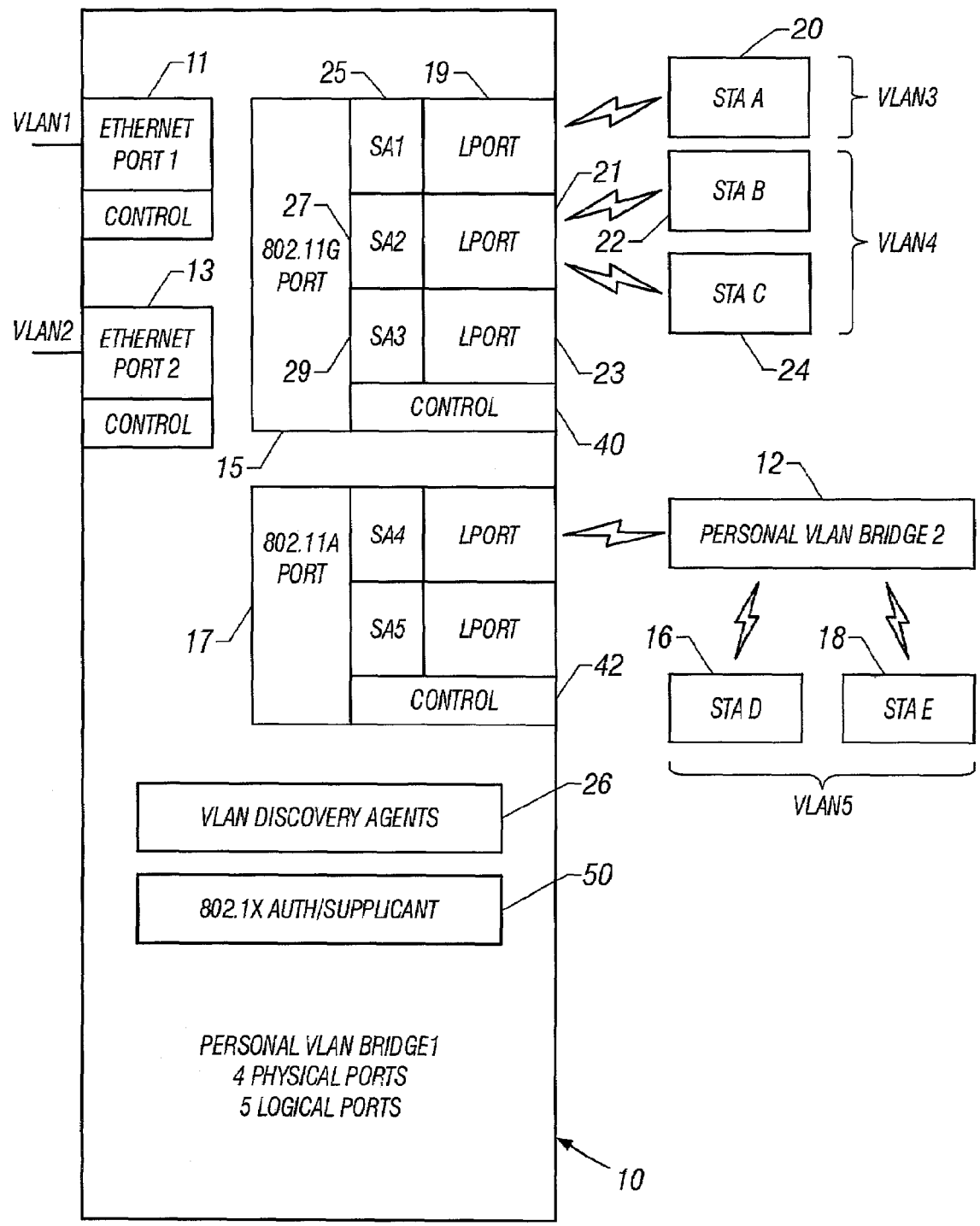
FIG. 1 is a block schematic diagram that illustrates two bridges in a Personal VLAN network according to the invention.
Figure 2:
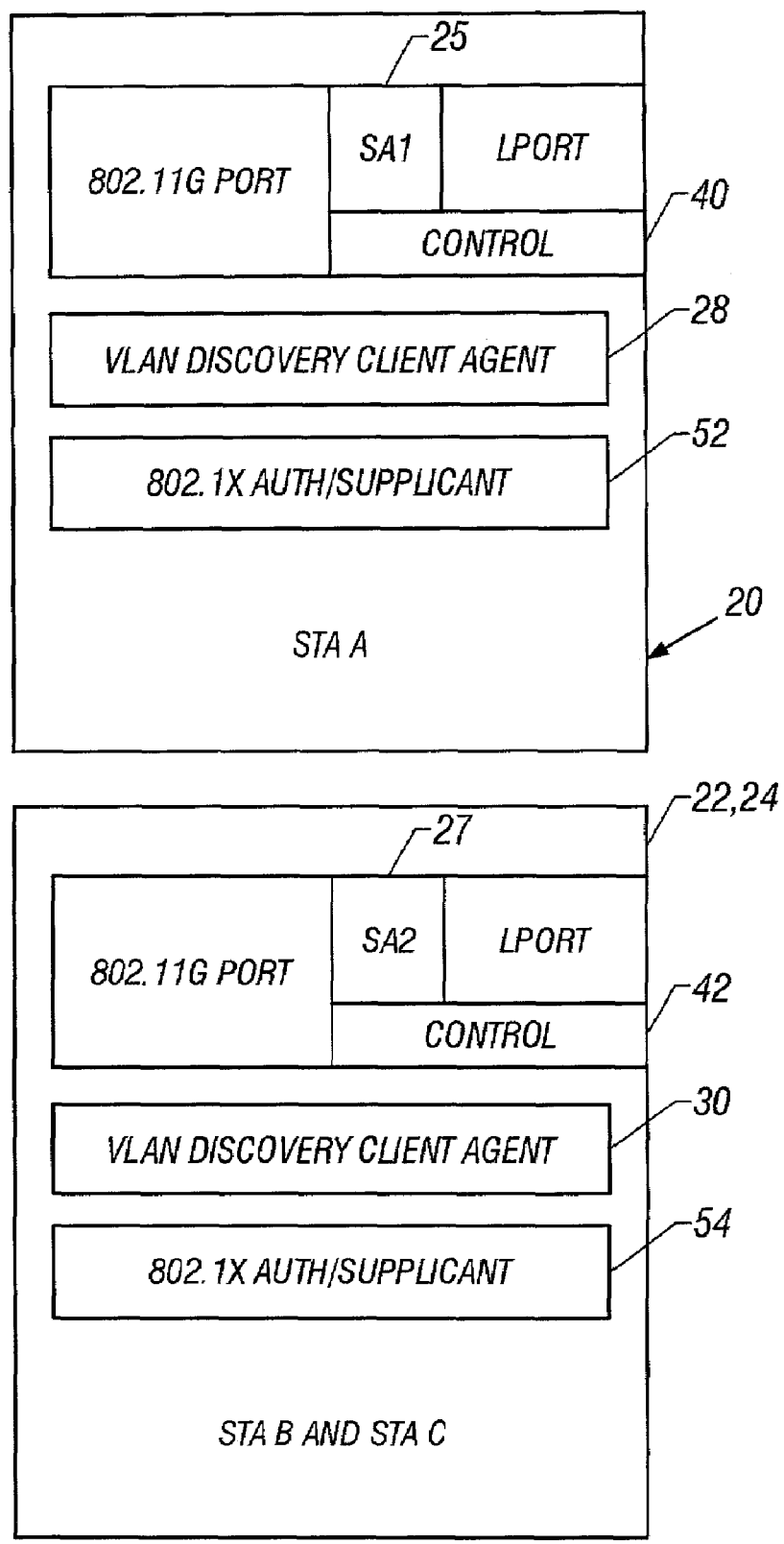
FIG. 2 is a block schematic diagram which shows an embodiment in which station A shares SA1 with bridge 1.
Figure 3:
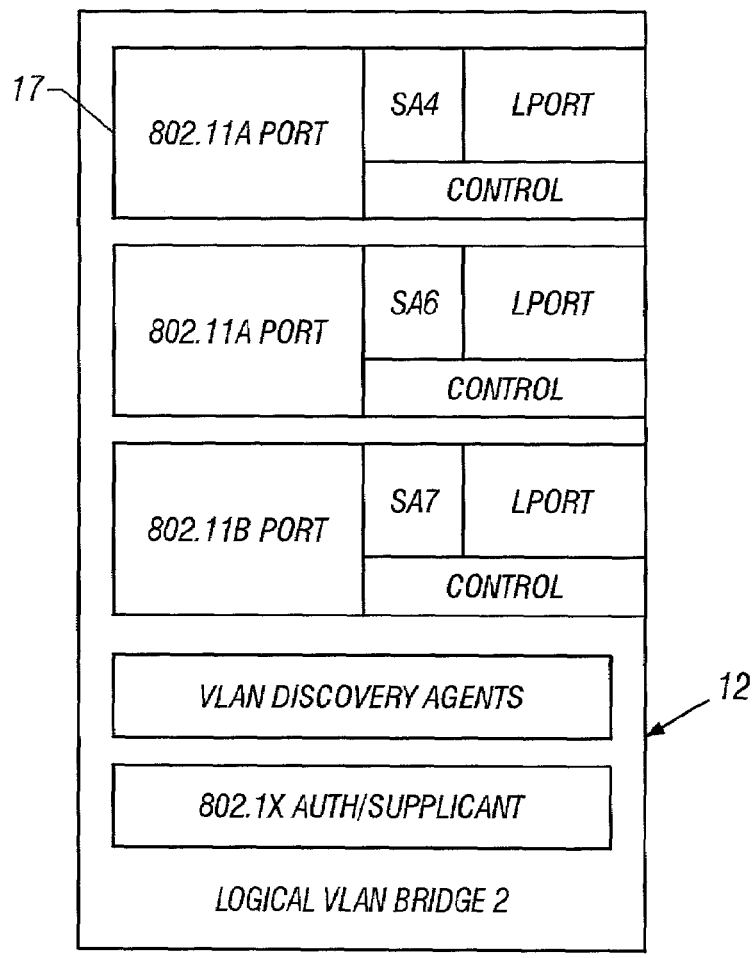
FIG. 3 is a block schematic diagram which shows an embodiment in which stations D and E belong to VLAN5, however unlike the other stations, they do not share security associations with bridge 1, but rather with personal VLAN bridge 2.
Figure 3:
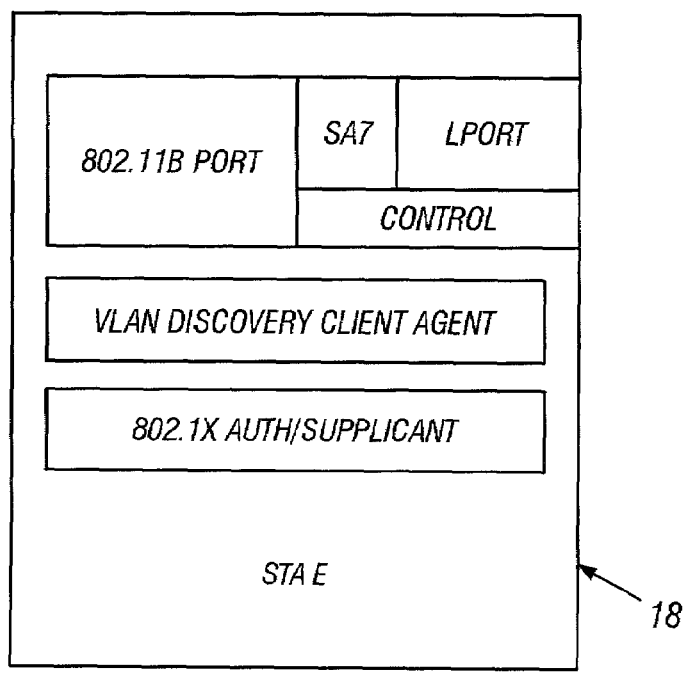

A presently preferred embodiment of the invention is discussed herein in connection with FIGS. 1–3. It will be appreciated by those skilled in the art that the configurations shown in FIGS. 1–3 are provided for purposes of example only and are not intended to limit the configurations with which the invention may be practiced.

FIG. 1 is a block schematic diagram that illustrates two bridges 10, 12. Personal VLAN Bridge 1 (10) has four physical ports 11, 13, 15, 17, two of which 11, 13 are wired Ethernet. The wired ports serve VLAN1 and VLAN2 respectively. The other two ports 15, 17 are wireless Ethernet ports. One of these ports 15 conforms to the high-rate (54 Mbps) 802.11g standard, and the other port 17 conforms to the 802.11a standard. There are three logical ports 19, 21, 23 associated with the 802.11g port. Each logical port has its own security association 25, 27, 29 which is shared by some number of end stations 20, 22, 24 to constitute a separate VLAN.

Station A 20 shares SA1 25 with bridge 1 10, as illustrated in FIG. 2. No other stations share SA1 and so STA A is in a unique VLAN, i.e. VLAN3, represented by a spanning tree whose root is bridge 1.

Stations B and C 22, 24, on the other hand, belong to VLAN4 because they share SA2 27 with bridge 1 (see FIG. 2). This VLAN was created by one of STA B or STA C. Then the other station joined it after being authenticated by the creator. This illustrates a case of joining a personal VLAN (see below). VLAN4 is also represented by a spanning tree with bridge 1 as root.

Stations D 16 and E 18 belong to VLAN5. However, unlike the other stations, they do not share security associations with bridge 1 but, rather, with Personal VLAN bridge 2 12 (see FIG. 3). Bridge 2 is the root of a spanning tree for VLAN5 until the tree was extended, making bridge 1 the new root.

In one embodiment, the Personal VLAN bridge extends the standard VLAN bridge in at least any of the following ways:

VLAN discovery: A Personal VLAN provides a protocol for VLAN discovery (discussed below).

VLAN extension/creation: A Personal VLAN bridge allows a station to create a new port that serves a new VLAN, or to join an existing VLAN or to join an existing VLAN via an authentication protocol.

Logical ports: A Personal VLAN bridge can maintain more than one logical port per physical port. It bridges between ports of any kind. A VLAN's member set is defined in terms of logical and physical ports. Every logical port has a lifetime controlled by the bridge.

Cryptographic VLAN separation: In a Personal VLAN, a logical port serves at most one VLAN. However, because there may be more than one logical port per physical port, more than one VLAN may exist on a physical port. Traffic within one VLAN is separated from another VLAN on the same physical port by cryptography. An authentication code uniquely identifies the VLAN to which the traffic belongs, while another level of encryption keeps the traffic private except to members of the VLAN.

Layer-2 VLAN support across routers: When an STA can roam and re-attach to a network at a different bridge, e.g. by associating with a new AP, the STA can inform the bridge of a VLAN to which it already belongs. The VLAN may have been created by a station, e.g. itself, at another bridge that links the VLAN with one or more logical or physical ports at that bridge. The STA can maintain its membership in the VLAN at layer 2 even though the new bridge may be located on a different subnet. This capability subsumes Mobile IP capability because Mobile IP aims to retain subnet membership for a station across routers. A subnet may correspond to a VLAN, but in general it does not.

Spanning tree maintenance: A Personal VLAN bridge permits an STA to create a VLAN where the STA itself is a bridge. A spanning tree algorithm eliminates cycles among bridges when membership is granted. The process for joining a personal VLAN enforces restrictions on VLAN topology that make re-constructing a spanning tree unnecessary after a new bridge joins a VLAN.

The presently preferred Personal VLAN bridge model parallels the VLAN model in terms of its rules for tagging frames, determining member/untagged sets, and in terms of components involved with relaying MAC frames, as described in IEEE Std 802.1Q-1998, IEEE Standards for Local and Metropolitan Area Networks: Virtual Bridged Local Area Networks, pp. 28. Extensions to these components in a Personal VLAN bridge are described below.

Personal VLAN Control Channels

Every physical port has a Personal VLAN control channel 40, 42 for sending and receiving control frames and authentication protocol frames. The channel has no security association and is identified by a frame field, e.g. Ethernet Type encoded. Authentication frames are preferably encapsulated using a format such as EAPoL (see IEEE 802.1X, IEEE Standards for Local and Metropolitan Area Networks: Port based Network Access Control, IEEE Std 802.1X-2001) which can handle a variety of authentication protocols.

VLAN Discovery

Figure 4:
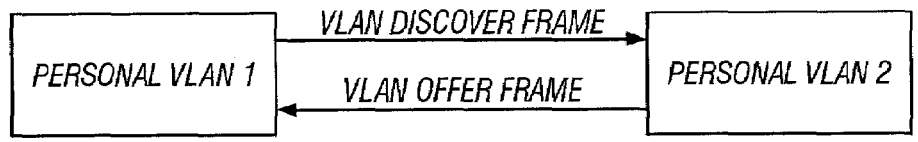
FIG. 4 is a block schematic diagram that shows Personal VLAN discovery according to the invention.
Figure 5:
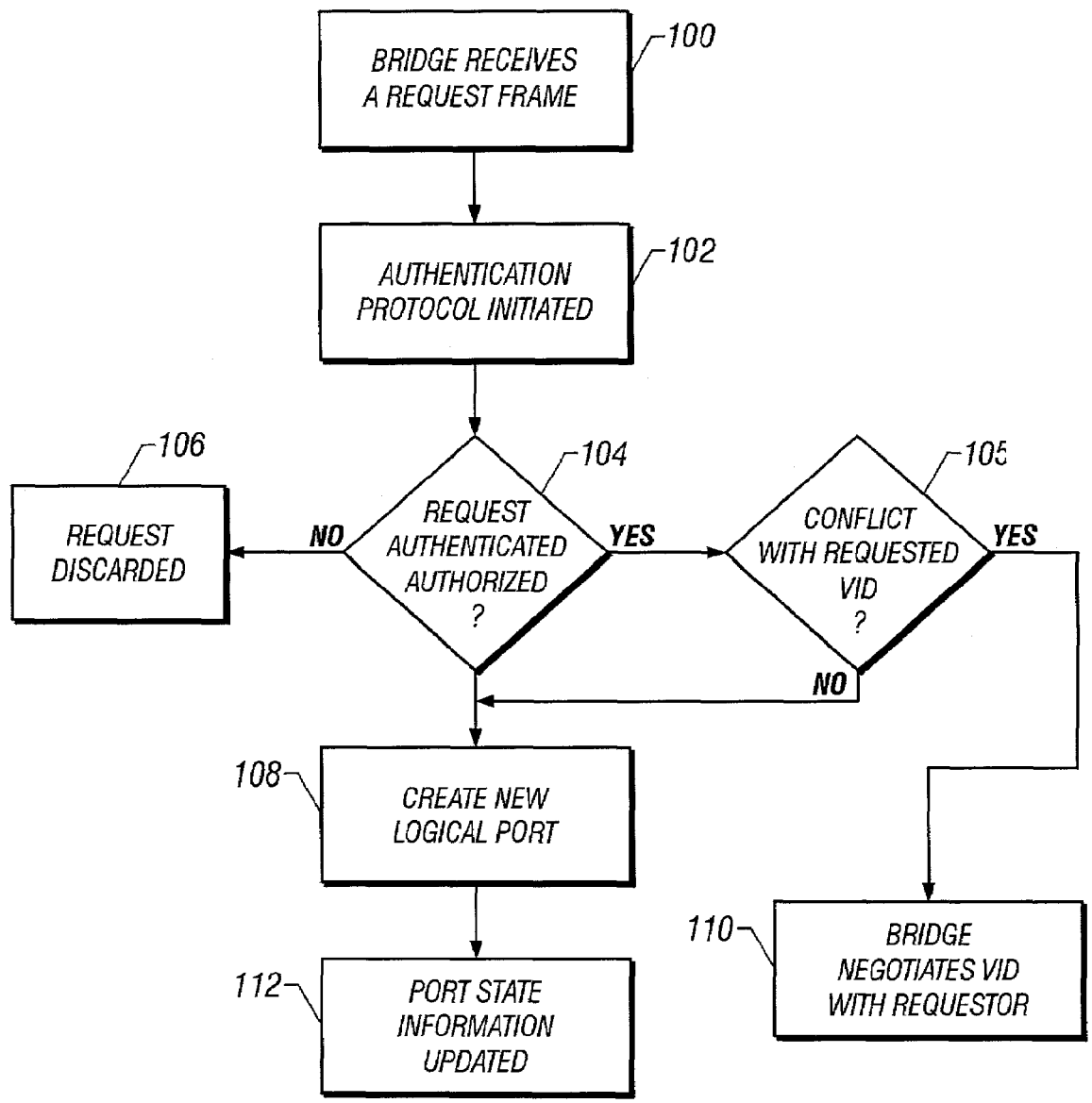
FIG. 5 is a flow diagram that shows the requesting of service for a new VLAN according to the invention.

A Personal VLAN bridge runs server and client VLAN discovery agents 26 and 28, 30, respectively. The server agent responds to information requests, while the client agent issues information requests. An example of such agents is the client and server agents of the Service Location Protocol v2, IETF, RFC 2608. Therefore, a Personal VLAN can discover other VLANs and/or allow the VLANs it serves to be discovered. Discovery (see FIG. 4) involves transmission of a VLAN-DISCOVER frame. In response, a VLAN-OFFER frame is sent to the source MAC address of the discover frame. An offer frame lists all or some of the VLANs served by a bridge and information that can be used to select from among them. There may be more than one offer frame received by a client in response to a discover frame it sent. Transmission of a VLAN-OFFER frame is delayed by some randomly chosen period of time to minimize collisions among responders.

Serving a New VLAN

A Personal VLAN bridge can receive a request to serve a new VLAN. The request contains the VID of the new VLAN. A request is not granted unless the requester is authorized, the request is fresh, and it can be authenticated through a control channel. To serve a new VLAN at a bridge requires making the bridge the root of a spanning tree for the named VLAN. Requesting service for a new VLAN consists of the following steps:

The bridge receives a request frame with a source MAC address through the control channel of some physical port. The holder of that MAC address is the requester (100).

Receipt of the request frame initiates an authentication protocol with the requester through the control channel (102).

If the requester cannot be authenticated, or is not authorized to request VLAN service from the bridge (104), then the request is discarded (106).

If there is no conflict in using the VID requested (105), a new logical port is created and associated with the physical port through which the request frame is received (108). This is the logical port the bridge uses to serve the VLAN. Otherwise, the bridge negotiates a VID with the requester (110). The VLAN's filtering rules are determined by a policy for the requester.

The port state information is updated for the logical port to include a security association (SA), shared with the requester that is in effect for all traffic through that port (112). Only the holder of the SA can change the logical port state Upon completion of these steps, a new logical port exists to serve the new VLAN, but the VLAN is not linked to any other VLAN served by the bridge until a request is made to join a particular VLAN. Until this time, the new VLAN is inoperable at the bridge.

Joining a VLAN

A new VLAN served by a bridge must extend one or more existing VLANs served by physical ports of the bridge to be useful. In other words, it must be linked to one or more existing VLANs. Linking the VLAN served by a logical port at a bridge to one or more VLANs served by physical ports at a bridge is performed through a join-VLAN request sent over a control channel. The request does not bridge the VLANs served by the physical ports. Rather, they remain separate yet the new VLAN extends all of them simultaneously.

A join-VLAN request contains the VID V' of a VLAN served by a logical port P' of the bridge, referred to herein as the source VLAN, and a set V of VIDs for VLANs served by a set of physical ports P, referred to herein as the destination VLANs. The request aims to link V' to every VLAN ID in V, or in other words, to allow the requester to join every VLAN in V. The requester has already created V'.

Figure 6:
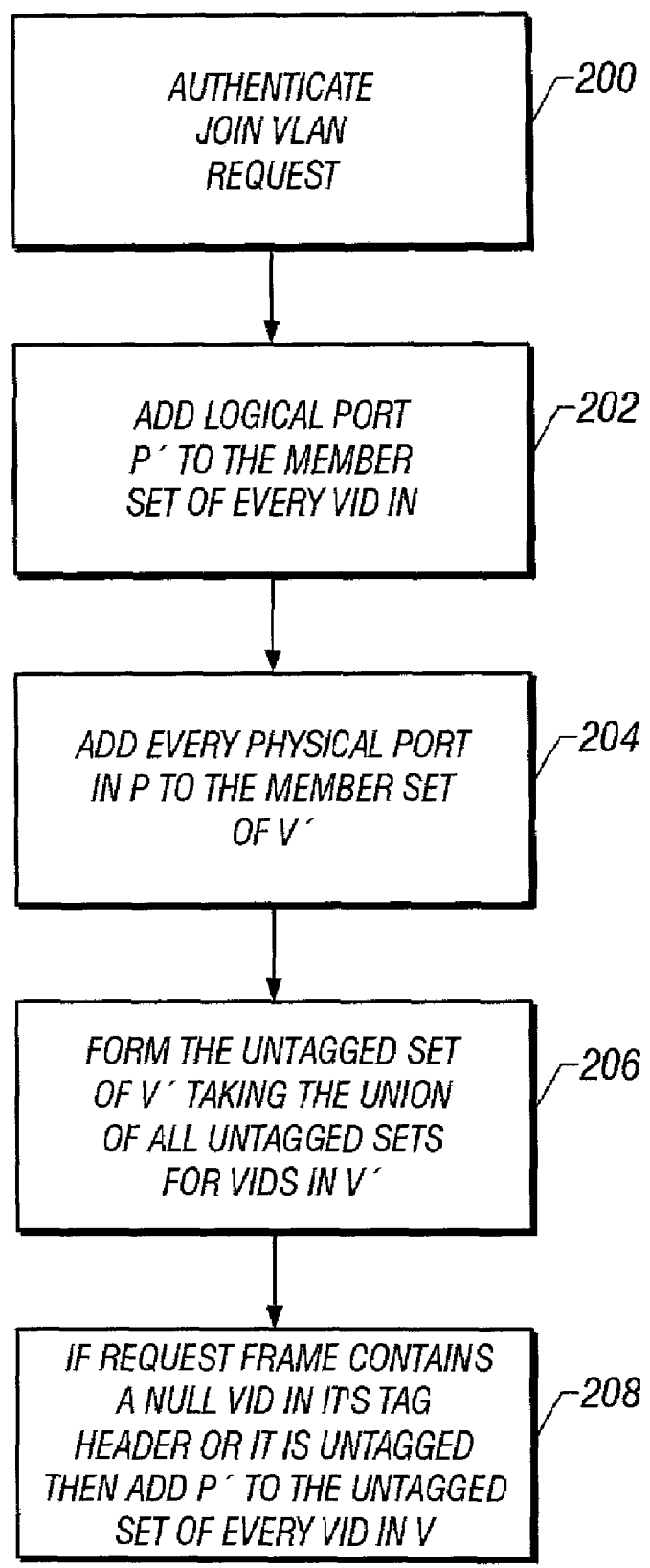
FIG. 6 is a flow diagram that shows linking of a VLAN served by a logical port at a bridge to one or more VLANs served by physical ports at a bridge according to the invention.

The bridge takes the following steps (see FIG. 6):

First the request is authenticated (200). This is done with respect to the SA associated with V' which was established when the bridge was asked to serve V'. A simple challenge-response strategy is used in the preferred embodiment, although other approaches may be used as appropriate. If authentication fails, the request is discarded.

Logical port P' is added to the member set of every VID in V (202), and every physical port in P is added to the member set of V' (204). The untagged set of V' is formed by taking a union of all untagged sets for VIDs in V (206). If the request frame contains a null VID in its tag header, or it is untagged, then P' is added to the untagged set of every VID in V (208).

The requests to serve a new VLAN and to link it to other VLANs can be combined into one request. Thus, creating a VLAN and joining another can be performed through one authentication process, specifically, the process required for serving a new VLAN.

Joining a Personal VLAN

Figure 7:
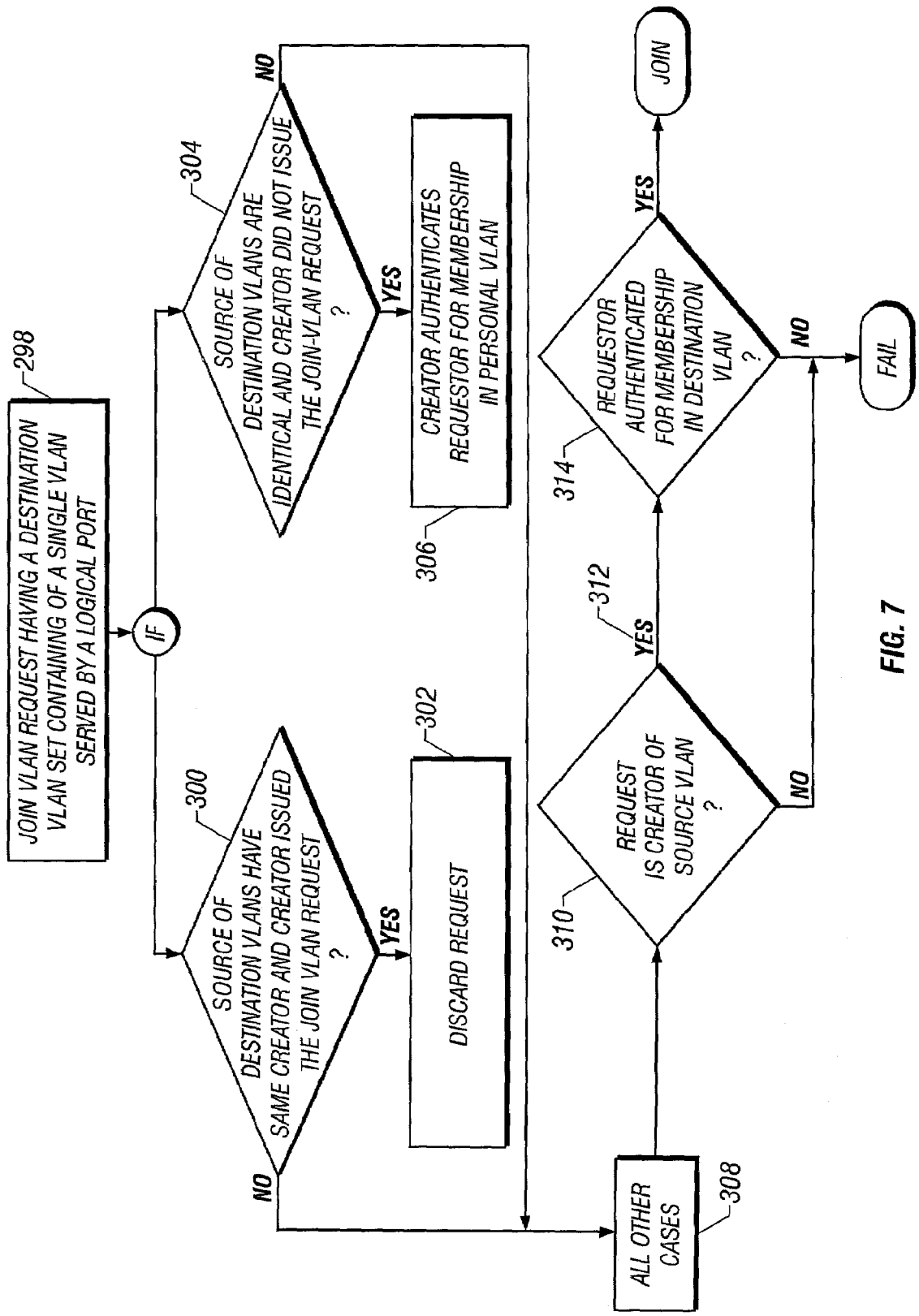
FIG. 7 is a flow diagram that shows inter-station authentication that is triggered when a bridge receives a join-VLAN request whose destination VLAN set consists of a single VLAN served by a logical port according to the invention.

Joining a personal VLAN, i.e. one served by a logical port, requires special treatment. A Personal VLAN bridge is not authorized to link VLANs served by logical ports because it did not create the ports, unlike its physical ports. In this case, the creator of the logical port authenticates the requester through a mutually-agreed upon protocol, for example, challenge-response. This inter-station authentication (see FIG. 7) is triggered when the bridge receives a join-VLAN request whose destination VLAN set consists of a single VLAN served by a logical port (298).

There are three cases:

The source and destination VLANs have the same creator, and the creator issued the join-VLAN request (300). In this case, the request is discarded (302). Otherwise, a cycle could result in the bridged VLANs.

The source and destination VLANs are identical and the creator did not issue the request (304). In this case, the creator authenticates the requester for membership into the Personal VLAN (306).

In all other cases (308), the bridge first authenticates the request to make sure that the requester is the creator of the source VLAN (same as step 1 for joining VLANs served by physical ports only—see above) (310). If authentication succeeds (312), then the creator authenticates the requester for membership into the destination VLAN (314).

When joining a personal VLAN, the destination VLAN set is preferably limited to exactly one VLAN, i.e. the source VLAN. It is constrained in this way because the request would otherwise reflect an attempt by a station to bridge a VLAN it does not own to other VLANs, something it is not authorized to do. The owner of a VLAN can join a new VLAN and, as a result, all its member stations also become members of the new VLAN.

Authentication of a requester by a creator is facilitated by a control channel of the bridge and respective Auth/Supplicant modules 50, 52, 54. The bridge uses the channel to relay authentication protocol messages between the creator and requester. Management of the control channel and relaying messages can be implemented using, for example, IEEE 802.1X, IEEE Standards for Local and Metropolitan Area Networks: Port based Network Access Control IEEE Std 802.1X-2001. In the 802.1X model, the requester is the Supplicant and the creator is the Authenticator. If the creator can authenticate the requester, then it shares the SA it holds with the bridge with the requester as well. It is not the bridge's responsibility to decide whether it should share with the requester the SA it holds with the creator. This is the creator's responsibility. There are many ways to achieve sharing. One way is to use the requester's public key to encrypt a Transport-Layer Security (TLS v1.0) pre-master secret from which the SA could be derived at the requester's station.

Ingress Filtering at Logical Ports

A security association contains at least two keys, one for encryption and the other for computing an authentication code, referred to herein as the Message Integrity Code (MIC). Uniquely, the SA is associated with a VLAN. The authentication code is used to limit traffic at the logical port to members of an entire VLAN, while encryption keeps the traffic private except to members. Only stations having the SA belong to the VLAN. There is a single broadcast domain for each SA. All stations having the SA belong to the same broadcast domain. Therefore, no separate encryption key is needed for broadcasts.

A physical port may serve more than one VLAN by virtue of having multiple logical ports associated with it (see FIG. 1). Therefore, unless the frame received at such a port carries a VID, its VLAN classification must use rules beyond port-based classification. See IEEE 802.1Q, IEEE Standards for Local and Metropolitan Area Networks: Virtual Bridged Local Area Networks IEEE Std 802.1Q-1998, D.2.2. Otherwise, there is no way to know at this stage which VID should be assigned from among the VLANs served by the port. It is necessary to identify the logical port through which the frame is received.

Figure 8:
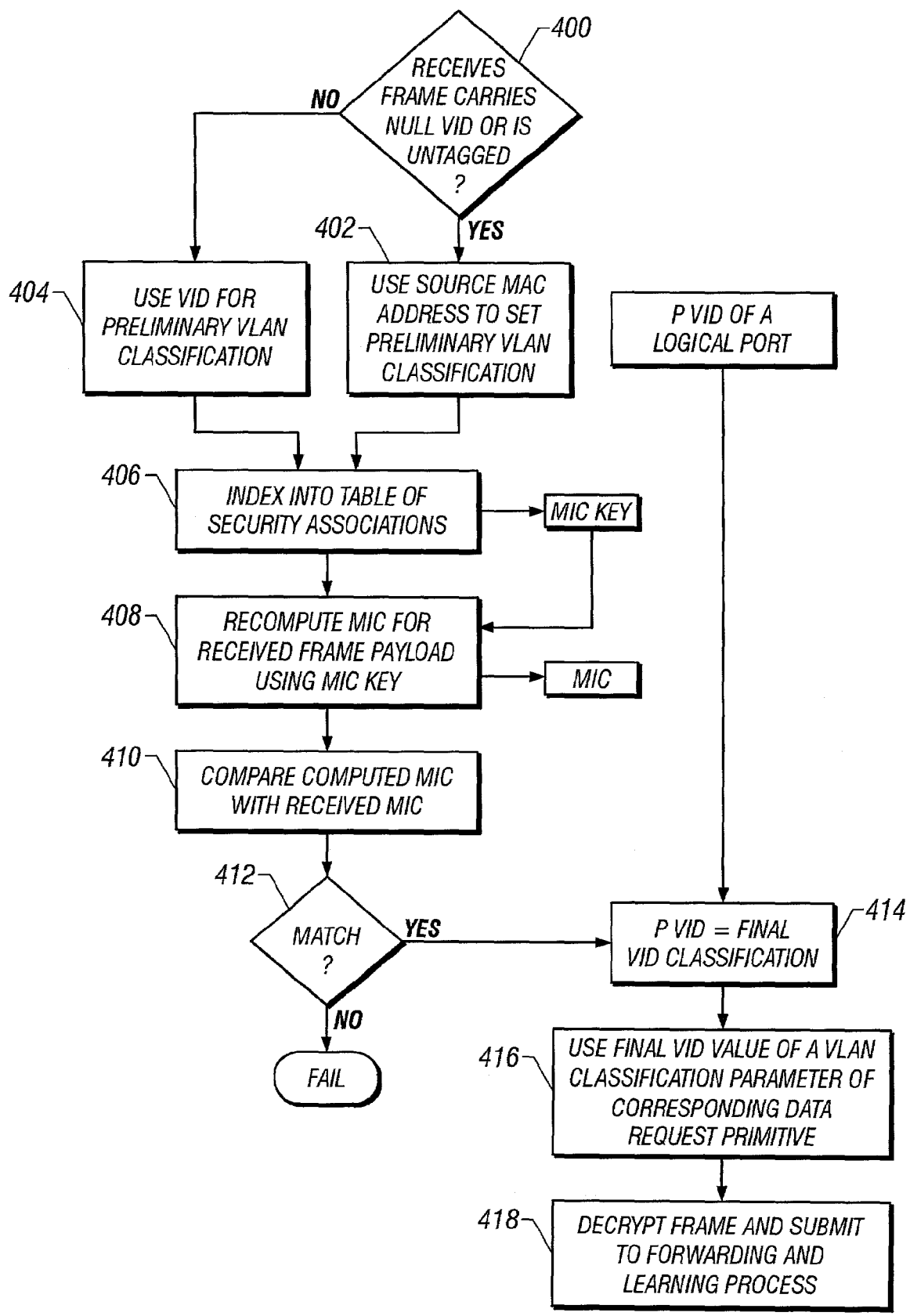
FIG. 8 is a flow diagram showing ingress filtering a logical ports according to the invention.

See FIG. 8 in connection with the following discussion. If the received frame carries a null VID or is untagged (400), then its source MAC address is used to determine a preliminary VLAN classification (402). This is the PVID of a logical port. If the frame carries a VID, then the VID is used as the preliminary classification instead (404). The preliminary classification is used to index into a table of security associations giving a MIC key (406). The received frame carries a MIC computed over the frame payload using a message digest algorithm, e.g. HMAC-MD5, agreed upon by both the bridge and requester at authentication time and recorded in the SA. The Personal VLAN bridge recomputes the MIC (408), using its MIC key, over the payload of the received frame, and then compares it with the received MIC (410). If they match (412), then the preliminary VLAN classification becomes the final VLAN classification (414). The final classification is used as the value of the VLAN classification parameter of any corresponding data request primitives (416). The frame is then decrypted, using the SA, and then submitted to the IEEE802.1Q Forwarding and Learning Processes (418). Otherwise, the frame is discarded.

Egress Filtering at Logical Ports

In the VLAN bridge model, if the transmission port for a frame that belongs to some VLAN is not in the member set of the VLAN, then the frame is discarded. The same rule applies to all logical transmission ports.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. In a system for segregating traffic amongst a plurality of stations that are associated with an access point, a method for joining a personal virtual local area network (VLAN) served by said access point, comprising steps of:

providing a control channel for authentication of a requester by a creator of said personal VLAN;

using said control channel to relay authentication protocol messages between said creator and said requester;

if said creator can authenticate said requester, then said creator sharing a security association it holds with said requester;

using said security association shared among members of said personal VLAN to identify frames originating from said members, wherein:

if a received frame carries a null virtual LAN ID (VID) or is untagged, then using its source MAC address to determine a preliminary VLAN classification of said received frame; and if said received frame carries a VID, then using said VID as said preliminary VLAN classification instead;

using said preliminary VLAN classification to index into a table of security associations giving an authentication code key;

said received frame carrying an authentication code computed over a frame payload thereof using a message digest algorithm agreed upon by both said creator and said requester at authentication time and having been recorded in said table of security associations;

a receiver of said received frame re-computing an authentication code, using said authentication code key, over said payload of said received frame;

comparing said re-computed authentication code with said received authentication code;

wherein if said re-computed authentication code and said received authentication code match, then said preliminary VLAN classification becomes a final VLAN classification;

using said final VLAN classification as a value of a VLAN classification parameter of any corresponding data request primitives;

decrypting said received frame using said security association; and submitting said decrypted frame to a forwarding and learning process;

otherwise, discarding said received frame.

2. The method of claim 1, wherein said access point may serve more than one VLAN by having multiple logical ports associated with it.

3. The method of claim 2, further comprising the step of:
providing ingress filtering at said logical ports.

4. The method of claim 2, wherein said security association contains at least two keys, one key for encryption and another key for computing an authentication code, wherein said security association is associated with a VLAN, wherein said authentication code is used to limit traffic at one of said logical ports to members of an entire VLAN, wherein encryption is used to keep traffic private except to members, wherein only stations having said security association belong to said VLAN, and wherein all stations having said security association belong to the same broadcast domain.

5. A method for segregating traffic among a plurality of end stations associated with a network access point comprising:

an end station from among said plurality of end stations performing an initial authentication operation;

receiving a frame at said end station;

if said received frame carries a null virtual LAN ID (VID) or is untagged, then using its source MAC address to determine a preliminary VLAN classification of said received frame;

if said received frame carries a VID, then using said VID as said preliminary VLAN classification instead;

using said preliminary VLAN classification to index into a table of security associations giving a cryptographic authentication code key;

said received frame including a cryptographic authentication code computed over a frame payload thereof using a cryptographic message digest algorithm that is determined at a time during said initial authentication operation, said cryptographic message digest algorithm being recorded in said table of security associations;

said end station re-computing said cryptographic authentication code, using said cryptographic authentication code key, over said payload of said received frame;

comparing said re-computed cryptographic authentication code with said received cryptographic authentication code;

wherein if said re-computed cryptographic authentication code and said received cryptographic authentication code match, then:

using said preliminary VLAN classification as a value of a VLAN classification parameter of any corresponding data request primitives;

decrypting said received frame using said table of security associations, and submitting said decrypted frame to a forwarding and learning process;

wherein if said re-computed cryptographic authentication code and said received cryptographic authentication code do not match, then discarding said received frame.

6. The method of claim 5 wherein said authentication code is a cryptographic authentication code which uniquely identifies a VLAN to which traffic belongs.

7. The method of claim 5 wherein said authentication code key is generated during said initial authentication.

8. The method of claim 5 wherein said initial authentication operation is performed between said end station and said access point.

9. The method of claim 8 wherein said cryptographic message digest algorithm is agreed upon by both said access point and said end station.

* * * * *